(12) United States Patent
Karaoguz

(10) Patent No.: US 8,929,943 B2
(45) Date of Patent: *Jan. 6, 2015

(54) MOBILE COMMUNICATION DEVICE PROVIDING COMMUNICATION PATHWAY DETERMINATION ASSISTANCE

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/440,335

(22) Filed: Apr. 5, 2012

(65) Prior Publication Data

US 2012/0196567 A1 Aug. 2, 2012

Related U.S. Application Data

(63) Continuation of application No. 11/419,156, filed on May 18, 2006, now Pat. No. 8,155,693.

(60) Provisional application No. 60/777,026, filed on Feb. 27, 2006.

(51) Int. Cl.
*H04M 1/00* (2006.01)
*H04W 88/06* (2009.01)
*H04W 8/18* (2009.01)

(52) U.S. Cl.
CPC ............. *H04W 88/06* (2013.01); *H04W 8/183* (2013.01)
USPC ................... 455/552.1; 455/418; 455/550.1; 370/352

(58) Field of Classification Search
CPC . H04W 88/06; H04W 8/245; H04M 1/72519; H04L 20/06027
USPC ....................... 455/552.1, 418, 550.1; 370/352
See application file for complete search history.

(56) References Cited

U.S. PATENT DOCUMENTS

| 8,229,431 | B2 * | 7/2012 | Buckley et al. | ............. 455/435.3 |
| 2001/0009853 | A1 * | 7/2001 | Arimitsu | ........................ 455/434 |
| 2005/0288017 | A1 * | 12/2005 | Doumenc et al. | .......... 455/435.3 |

* cited by examiner

*Primary Examiner* — Danh Le
(74) *Attorney, Agent, or Firm* — Brinks Gilson & Lione

(57) ABSTRACT

A system and method in a mobile communication device for providing assistance to a user in determining a communication pathway. A system may comprise processor-executable instructions, that when executed by a processor, cause a mobile communication device that supports a communication type over multiple networks to access availability information stored in a remote database for determining available networks among the multiple networks for performing the communication type, determine the available networks using the availability information, provide user assistance for determining a selected network among the available networks for the communication type, and perform the communication type using the selected network.

20 Claims, 8 Drawing Sheets

US 8,929,943 B2

MOBILE COMMUNICATION DEVICE PROVIDING COMMUNICATION PATHWAY DETERMINATION ASSISTANCE

CROSS-REFERENCE TO RELATED APPLICATIONS/INCORPORATION BY REFERENCE

The present application is a continuation of and claims priority from U.S. patent application Ser. No. 11/419,156, filed May 18, 2006, and titled "MOBILE COMMUNICATION DEVICE PROVIDING COMMUNICATION PATHWAY DETERMINATION ASSISTANCE," the contents of which are hereby incorporated herein by reference in their entirety, which is related to and claims priority from U.S. Provisional Patent Application Ser. No. 60/777,026, filed Feb. 27, 2006, and titled "MOBILE COMMUNICATION DEVICE PROVIDING COMMUNICATION PATHWAY DETERMINATION ASSISTANCE," the contents of which are hereby incorporated herein by reference in their entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

A mobile communication device may be adapted to communicate over a plurality of communication networks. A user of a mobile communication device may, for example, communicate with a first party that is capable of communicating over a first communication network. The user may also, for example, communicate with a second party that is capable of communicating over a second communication network. In an exemplary scenario, the user may further, for example, communicate with the first party over the second communication network (e.g., if the first party is also capable of communicating over the second communication network). Such communication over the plurality of communication networks is generally handled independently.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a mobile communication device for providing assistance to a user in determining a communication pathway, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION

Figure 1:
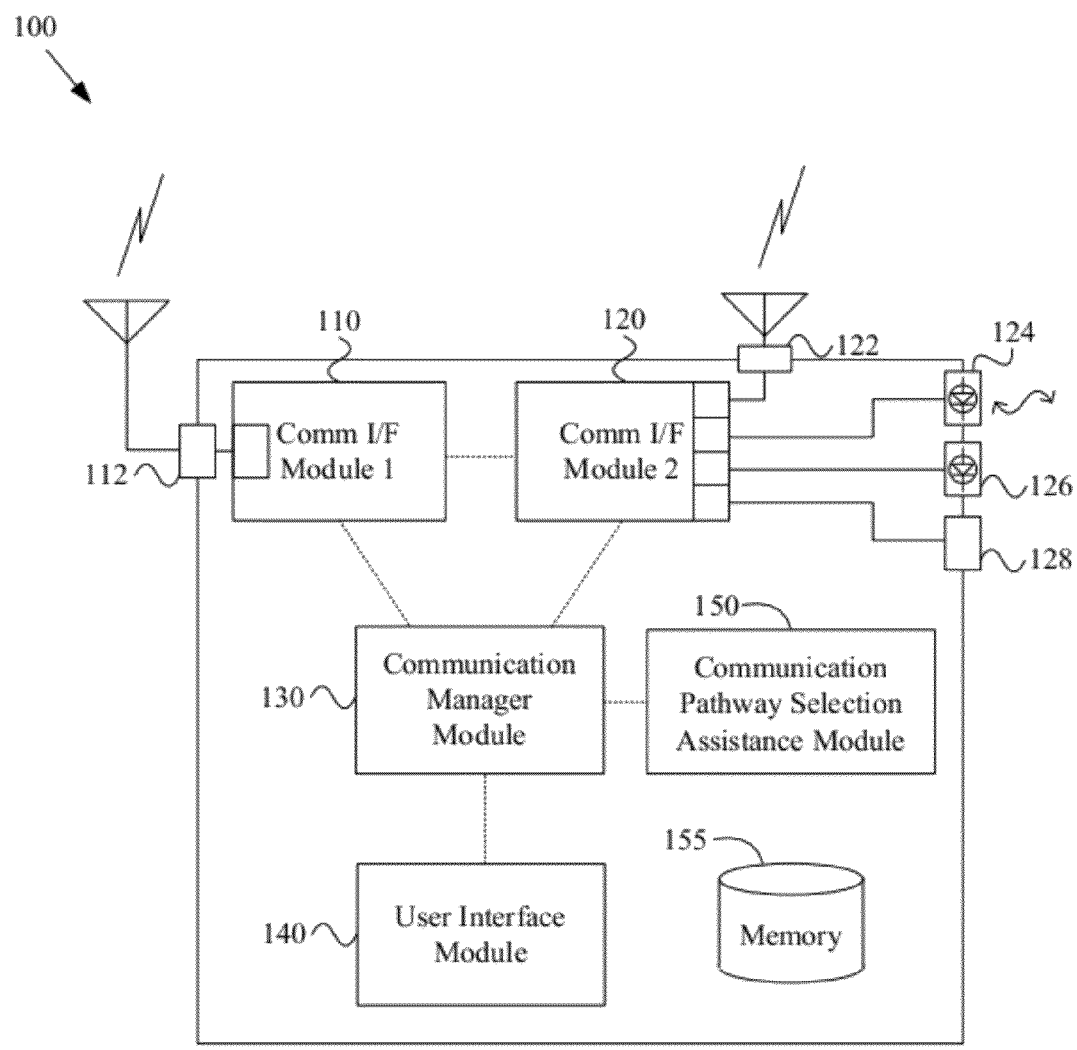
FIG. 1 is a block diagram illustrating an exemplary mobile communication device adapted to provide communication pathway determination assistance, in accordance with various aspects of the present invention.

FIG. 1 is a block diagram illustrating an exemplary mobile communication device adapted to provide communication pathway determination assistance, in accordance with various aspects of the present invention. The mobile communication device 100 may comprise characteristics of any of a variety of types of mobile communication devices. For example and without limitation, the mobile communication device may comprise characteristics of a cellular telephone, personal digital assistant, handheld computer, personal email device, portable music player with communication capability, portable navigation system, Internet gaming device, etc. Accordingly, the scope of various aspects of the present invention should not be limited by characteristics of any particular type of mobile communication device.

The exemplary mobile communication device 100 may comprise at least one communication interface module adapted to communicate with (i.e., directly with) a plurality of communication networks. Such flexibility, among other things, provides the mobile communication device 100 the capability to communicate over a plurality of alternative communication pathways (e.g., with a single other communication device or a plurality of other communication devices).

The mobile communication device 100 may comprise a first communication interface module 110 and a second communication interface module 120. The illustration of two distinct communication interface modules is for illustrative clarity and should not be limiting. For example, the mobile communication device 100 may comprise more than two communication interface modules. Also for example, communication interface modules may share various hardware and/or software components rather than having distinct boundaries.

The first communication interface module 110 may, for example, be adapted to communicate with (or over) a first communication network (and, e.g., one or more associated communication pathways). Such a first communication network may, for example, be or comprise various characteristics of a telephony communication network. Such a telephony communication network may, for example, be or comprise various characteristics of a cellular telephone network or the Public Switched Telephone Network ("PSTN"). In an exemplary configuration where the first communication interface module 110 is adapted to communicate over a cellular telephone network, the first communication interface module 110 may, for example, be adapted to communicate in accordance with any of a large variety of cellular communication standard and/or propriety communication protocols (e.g., 1 G, 2 G, 3 G, 4 G, CDMA, WCDMA, PDC, TDMA, GSM/GPRS/EDGE, CDMA2000, etc.).

The first communication interface module 110 may be adapted to communicate over any of a variety of communication media. For example, the first communication module 110 may be adapted to communicate wirelessly utilizing the wireless port 112. Alternatively, for example, though not illustrated in FIG. 1, the first communication interface module 110 may be adapted to communicate via wired interface, non-tethered optical interface or tethered optical interface.

The second communication interface module 120 may, for example, be adapted to communicate with (or over) a second communication network (and, e.g., one or more associated communication pathways). Such a second communication network may, for example, be or comprise various characteristics of a computer communication network. In such an exemplary configuration, a computer communication network may, for example, be or comprise various characteristics of any of a variety of computer communication networks (e.g., the Internet, a Wide Area Network ("WAN"), a Local Area Network ("LAN"), a Personal Area Network ("PAN"), a Metropolitan Area Network ("MAN"), a terrestrial computer communication network, a satellite computer communication network, etc.). Also, in such an exemplary configuration, the second communication interface module 120 may, for example, be adapted to communicate with the computer communication network utilizing any of a large variety of lower level standard and/or proprietary protocols (e.g., IEEE 802.3, IEEE 802.11, IEEE 802.15, IEEE 802.16, IEEE 802.20, etc.) or higher-level standard and/or proprietary protocols (e.g., TCP/IP).

As with the first communication interface module 110, the second communication interface module 120 may be adapted to communicate over any of a variety of communication media. For example and without limitation, the second communication interface module 120 may be adapted to communicate via a wireless communication link (e.g. utilizing the wireless port 122), via a wired communication link (e.g., utilizing the wired communication port 128), via a non-tethered optical link (e.g., utilizing the non-tethered optical port 124) or via tethered optical link (e.g., utilizing the tethered optical port 126).

The exemplary mobile communication device 100 may also comprise a communication manager module 130 generally adapted to manage communications occurring with the mobile communication device 100. The communication manager module 130 may be or comprise characteristics of any of a large variety of modules or devices associated with performing general communication tasks in a mobile communication device. For example and without limitation, the communication manager module 130 may comprise or oversee operation of various signal processors, codecs, user interfaces, applications, etc., which may be associated with any of the plurality of communication networks and/or types of communication with which the mobile communication device 100 may be capable of communicating.

For example, the communication manager module 130 may be adapted to utilize at least one communication interface module (e.g., the first communication interface module 110 and/or second communication interface module 120) to conduct a particular type of communication with (or over) any of a plurality of communication networks (and associated communication pathways) with which the at least one communication interface module is adapted to communicate.

The following discussion will, at times, refer to various types of communication that may be performed over a communication network or pathway (e.g., over a computer communication network). Such various types of communication may generally relate to specific types of information being transmitted (e.g., types of payload information). Examples of such various types of communication may, for example, comprise data file communication (e.g., communicating various types of computer data files like MP3 files, WAV files, MPEG files, word processor files, JPEG files, drawing files, software files, etc.), voice conversation communication (e.g., substantially real-time voice communication between two or more parties), multimedia conversation communication (e.g., substantially real-time multimedia communication between two or more parties), email communication, instant text message communication, web browsing communication, music streaming, video streaming, radio broadcasting, television broadcasting, real-time multiparty Internet gaming, etc.

The communication manager module 130 may, for example, utilize at least one communication interface module (e.g., the first communication interface module 110 and/or the second communication interface module 120) to conduct a desired communication over an identified communication network (or an associated communication pathway). Determination of a communication network and/or associated communication pathway will be discussed in more detail below.

The communication manager module 130 may also, for example, be adapted to perform or manage various secure access and/or secure communication functionalities. Also for example, the communication manager module 130 may be adapted to perform or manage various power management functionalities. Additionally for example, the communication manager module 130 may be adapted to control user access to particular functions that the mobile communication device 100 is capable of performing.

Also for example, the communication manager module 130 may be adapted to perform or manage various flows of information within the mobile communication device 130. For example, the communication manager module 130 may be adapted to control the flow of information between various protocol stack layers (e.g., between an application layer, transport layer, network layer, etc.). Also for example, the communication manager module 130 may be adapted to perform or manage the functionality of various protocol stack layers. The communication manager module 130 may thus be adapted to manage the flow of various types of information between various devices, modules or sub-modules. Such types of information may, for example, include control information, numerical information, textual information, audio information, video information, graphical information, pictorial information, etc.

The exemplary mobile communication device 100 may also comprise a user interface module 140. The user interface module 140 may generally provide an interface between the mobile communication device 100 and a user of the mobile communication device 100. The user interface module 140 may comprise characteristics of any of a variety of user interfaces. The user interface module 140 may, for example and without limitation, be adapted to provide any of a variety of audio, video and/or tactile user interfaces. For example, the user interface module 140 may be adapted to provide video display, audio speaker, video camera, microphone, touch screen, touchpad, keypad and vibration U/I functionality.

The mobile communication device 100 (e.g., the communication manager module 130) may, for example, utilize the user interface module 140 to provide a communication interface (e.g., video, audio and/or textual) between a user of the mobile communication device 100 and other devices communicatively coupled to the mobile communication device 100. For example, the mobile communication device 100 may utilize the user interface module 140 to notify a user of an incoming message to the mobile communication device 100 from another communication device (e.g., another mobile communication device).

As a non-limiting example, the mobile communication device 100 may utilize the user interface module 140 to provide a user interface for information communicated over various communication networks, where the user interface shares various characteristics with a typical mobile telephone user interface. For example, for communications between the mobile communication device 100 and another mobile communication device over a computer communication network, the mobile communication device 100 may utilize the user interface module 140 to provide a user interface that is generally the same as the user interface for a mobile telephone communication over a mobile telephone communication network.

As will be discussed below, the user interface module 140 may be utilized by various other modules of the mobile communication device 100. For example, various other modules of the mobile communication device 100 (e.g., the communication pathway selection assistance module 150) may utilize the user interface module 140 to communicate information to a user regarding communication networks (or pathways) that are presently available for communication and/or various types of communication that may presently be performed over available communication networks. Additionally, various other modules of the mobile communication device 100 may utilize the user interface module 140 to communicate information to a user of the mobile communication device 100 indicating a manner in which the user may act to enable communication over a particular communication network and/or enable a particular type of communication. Such information may, for example, comprise contact information, payment information, information regarding user authentication, exigency information, etc.

In a non-limiting exemplary scenario, the user interface module 140 may be adapted to (e.g., under the direction of the communication manager module 130 and/or the communication pathway selection assistance module 150) receive user input indicative of a desired communication. Such input may be solicited by the user interface module 140 or may be unsolicited.

In a non-limiting exemplary scenario comprising the user interface module 140 soliciting such user input, the user interface module 140 may be adapted to present a first plurality of visual indicia (or other indicia) to the user (e.g., only the first plurality or in addition to one or more other indicia). The user may then, for example, select presented indicia (e.g., by touch screen, scrolling, voice, key press, touchpad, etc.).

Each indicium of the first plurality of indicia may, for example, be associated with performing a particular type of communication over a particular communication network or pathway (e.g., over which the communication interface modules 110 and 120 are capable of communicating). The user interface module 140 may then, for example, be adapted to receive a user selection of a presented visual indicium. Information of a selected indicium may be processed by the user interface module 140 and/or may be forwarded to other modules of the mobile communication device 100 (e.g., the communication manager module 130 or the communication pathway selection assistance module 150).

Visual indicia may comprise any of a variety of characteristics. For example, visual indicia may comprise characteristics of graphical images (e.g., icons), pictorial images, textual images, etc. Such visual indicia may, in turn, be characterized by various visual characteristics (e.g., color, brightness, sharpness, size, animation, menu position, etc.). Such visual characteristics may, for example, be indicative of various communication-related characteristics (e.g., the availability of particular communication networks or pathways, particular types of communication, particular third parties, particular other communication nodes or devices, etc.).

In one example, the user interface module 140 may be adapted to present a first visual indicium associated with establishing voice conversation communication with a first communication device over a first communication network (e.g., a cellular telephone network). Continuing the example, the user interface module 140 may also be adapted to present a second visual indicium associated with establishing voice conversation communication with the first communication device over a computer network (e.g., a LAN or the Internet). Continuing the example, the user interface module 140 may additionally be adapted to present a third visual indicium associated with establishing a web browsing session with a web browser over the first communication network (e.g., over a cellular telephone network using GPRS/EDGE). Continuing the example, the user interface module 140 may further be adapted to present a fourth visual indicium associated with establishing a web browsing session with the web browser over the second communication network (e.g., a LAN or the Internet).

In a scenario where the user interface module 140 is adapted to present visual indicia indicative of particular communications, the visual indicia may, for example, comprise characteristics indicating the availability of particular communication networks (or pathways) or particular types of communication (e.g., in general or with regard to particular third parties). In a non-limiting exemplary scenario, the user interface module 140 might only present indicia representative of a communication that may presently be established, while not presenting indicia associated with presently unavailable communications. In another non-limiting exemplary scenario, the user interface module 140 might present indicia associated with potential communications, but utilize particular visible characteristics of the indicia to indicate communications that are presently available.

For example, in a first non-limiting exemplary scenario, the user interface module 140 might present a first indicium associated with establishing a first voice conversation communication with a third party over a first communication network or pathway (e.g., a cellular telephone network) and a second indicium associated with establishing a second voice conversation communication with the third party over a second communication network or pathway (e.g., a particular computer network). The first indicium may, for example, be colored, sized, sharpened, highlighted, etc., to indicate that a voice conversation communication link over the first communication network or pathway may be presently established (or even that the third party is presently available over such network). The second indicium may, for example, be colored, sized, blurred, dimmed, etc., to indicate that a voice conversation communication link over the second communication network or pathway may not be presently established (or even that the third party is not presently available over such network).

Continuing the first non-limiting exemplary scenario, the user interface module 140 may also present one or more indicia and make such indicia selectable or non-selectable by the user according to whether or not the particular communication is available. For example, if a computer network (or pathway) for communicating voice conversation information (e.g., utilizing VoIP) is not presently available, the user interface module 140 may, alternatively or in addition to characterizing an indicium associated with the unavailable computer network (or pathway) with particular visual characteristics, make the visual indicium non-selectable by the user.

In a non-limiting exemplary scenario comprising the user interface module 140 receiving unsolicited user input, the user interface module 140 may be adapted to monitor (e.g., continually, periodically or by interrupt) various user input features of the mobile communication device 100. Such user input features may, for example, include keypads, touch pads, voice input, touch screen input, etc.

The user interface module 140 (e.g., independently or under the control of other modules of the mobile communication device 100) may present visual indicia associated with particular communications in response to any of a variety of causes or conditions. For example, a user may indicate a general desire to establish a communication, and in response to such indication, the user interface module 140 may present the visual indicia to the user. Also for example, a user may indicate a specific desire to establish a communication with a particular third party or group, and in response to such indication, the user interface module 140 may present the visual indicia to the user (e.g., as a list of communication options or alternatives). Further for example, a user may indicate a specific desire to establish a particular type of communication with a particular third party or group, and in response to such indication, the user interface module 140 may present the visual indicia to the user (e.g., as a list of communication network or pathway alternatives).

In another non-limiting exemplary scenario, the user interface module 140 may be adapted to present (e.g., independently and/or working in conjunction with one or more other modules of the mobile communication device 100) a variety of types of information to a user regarding particular communication networks and/or pathways (e.g., instead of, or in addition to, information related to the availability of such communication networks and/or pathways). The user interface module 140 may, for example, be adapted to present such information with visible and/or audible characteristics.

Such information may, for example, comprise information that may assist the user (e.g., may be considered by the user) in determining which of a plurality of communication networks (or pathways) to utilize for a communication. For example and without limitation, such information may comprise information regarding communication quality, cost, data rate, noise, error rate, historical success/failure, bandwidth availability, aggregate metrics, recommendation, etc. Various examples of such information will be presented later.

A user of the mobile communication device 100 may, for example, analyze such information in determining which communication network(s) (or communication pathways(s)) to utilize for a particular communication.

In general, the user interface module 140 may be adapted to provide an interface between the mobile communication device 100 and a user thereof. Accordingly, the scope of various aspects of the present invention should not be limited by particular user interface characteristics unless explicitly claimed. Additionally, the scope of various aspects of the present invention should not be limited by characteristics of a particular type of user interface or hardware and/or software that provide a particular type of user interface.

As mentioned previously, the mobile communication device 100 may comprise a communication pathway selection assistance module 150 ("CPSAM"). The CPSAM 150 may be adapted to provide assistance to a user in determining which of the first plurality of communication networks to utilize for performing a particular type of communication.

In a non-limiting exemplary scenario, a user may be confronted with the option of conducting a particular communication over any of a plurality of communication networks (or associated pathways). For example, the user may be confronted with the option of conducting a voice conversation communication over a first cellular telephone network, a first computer network (e.g., an office LAN), a television network, a second cellular telephone network, a second computer network (e.g., the Internet) or a global satellite communication network. Having such options is beneficial in that the user is most likely going to be able to conduct a successful communication. However, the user may be overwhelmed by deciding which communication network or pathway to utilize and, without assistance, may choose a non-optimal communication solution. The CPSAM 150 may be adapted to (e.g., automatically or with interaction with the user) provide assistance to the user in determining which of the available communication network (or pathway) options to utilize.

For example, in an exemplary scenario where the mobile communication device 100 is capable of communicating over a first plurality of communication networks, the CPSAM 150 may be adapted to determine which communication networks of the first plurality of communication networks are presently available. For example, some of the first plurality of communication networks might not be within range, might not presently be able to provide a particular minimum level of communication quality, etc.

Also for example, in an exemplary scenario where the mobile communication device 100 is capable of conducting a particular type of communication (e.g., voice conversation communication) over a first plurality of communication networks, the CPSAM 150 may be adapted to determine which communication networks of the first plurality of communication networks are presently available for conducting the particular type of communication. For example, in various scenarios, the general availability of a communication network might not be commensurate with the availability of a communication network for conducting a particular type of communication. For example and without limitation, a communication node with which the user of the mobile communication device desires to communicate might not be able to communicate with a particular one of the first plurality of communication networks (or pathways) or might not be able to conduct a particular type of communication (e.g., Internet voice communication) over a particular one of the first plurality of communication networks.

The CPSAM 150 may be adapted to determine which of the first plurality of communication networks (or pathways) are available and/or which of the first plurality of communication networks (or pathways) are available to perform a particular type of communication in any of a variety of manners.

For example, the CPSAM 150 may be adapted to access (and analyze) information stored in a memory (e.g., local to or remote from the mobile communication device 100). The CPSAM 150 may, for example, be adapted to utilize at least one communication interface module of the mobile communication device 100 (e.g., the first communication module 110 or the second communication module 120) to access information stored in a database remote from the mobile communication device 100. The CPSAM 150 may then, for example, be adapted to process the accessed information to determine which of the first plurality of communication networks (or pathways) are presently available for performing the first particular type of communication.

Such accessed information may comprise any of a variety of types of information. For example and without limitation, such accessed information may comprise information regarding whether the mobile communication device 100 and/or another communication device is presently registered or communicatively coupled to particular communication networks. Such accessed information may also, for example, comprise information regarding communication capabilities of the mobile communication device 100 and/or another communication device (e.g., whether a communication device is capable of performing a particular type of communication, for example, VoIP communication). Such accessed information may additionally, for example, comprise information regarding whether the mobile communication device 100 and/or another communication device is allowed access to a particular communication network or to performing a particular type of communication over a particular communication network. Such access information may further, for example, comprise information in a directory of communication devices (or users thereof). Such a directory, for example, be associated with a single type of communication or may be associated with a plurality of types of communication.

In an exemplary scenario, where the CPSAM 150 accesses such information, the CPSAM 150 may be adapted to access such information in any of a variety of manners. For example and without limitation, the CPSAM 150 may be adapted to utilize a communication interface module of the mobile communication device 100 to access information in a network central database, network distributed database, metropolitan or national registry, communication device manufacturer database, worldwide communication device registry, etc.

The CPSAM 150 may also be adapted to determine which of the first plurality of communication networks (or pathways) are available (or, e.g., available for performing a particular type of communication) by communicating test messages. For example and without limitation, the CPSAM 150 may be adapted to utilize a communication interface module (e.g., the first communication interface module 110 and/or the second communication interface module 120) to transmit test messages and receive responses to the test messages.

Such test messages and responses thereto may comprise any of a variety of characteristics (e.g., of varying complexity). For example, the CPSAM 150 may be adapted to utilize various communication interface modules to transmit (or receive) "ping" or "beacon" messages to determine whether a particular communication network is available. Also for example, a test message may correspond to an inquiry into communication network and/or communication device capability (e.g., inquiring as to whether a particular communication network and/or communication node or device is capable of performing a particular type of communication). Further for example, a test message may be utilized to determine communication conditions corresponding to a particular communication network (e.g., latency, error rate, data rate, quality of service, etc.). In an exemplary scenario, the CPSAM 150 may be adapted to communicate a plurality of test messages to a single communication node (e.g., a communication device with which the user of the mobile communication device is interested in communicating) over a plurality of different communication networks (or pathways).

The CPSAM 150 may be adapted to process a response to a test message (or lack of a response) in any of a variety of manners. For example and without limitation, the CPSAM 150 may be adapted to determine whether a response was received. Also for example, the CPSAM 150 may be adapted to determine a turnaround time (or latency) period for a response to a test message. Additionally for example, the CPSAM 150 may be adapted to analyze a response message to a test message inquiring into communication network and/or communication device capability. Further for example, the CPSAM 150 may be adapted to analyze echoed data in a response to determine error rate. In an exemplary scenario where the CPSAM 150 communicated a plurality of test messages to the same communication node or device, the CPSAM 150 may be adapted to compare respective responses to the plurality of test messages (e.g., to compare latency, error rate, data rate, quality of service, generally determine effectiveness of various communication networks or pathways, etc.).

In addition to determining availability of various communication networks (or pathways) for communication or for particular types of communication, the CPSAM 150 may be adapted to determine various characteristics of each of a plurality of communication networks (or pathways) and/or various characteristics of performing a particular type of communication over each of a plurality of communication networks (or pathways). Such characteristics may then be analyzed (e.g., by the CPSAM 150 and/or a user of the mobile communication device 100) to determine which of the plurality of available communication networks (or pathways) to utilize (e.g., for a particular communication or a particular type of communication).

Such characteristics related to a particular communication network (or pathways) and/or performing a particular type of communication over a particular communication network (or pathways) may comprise any of a variety of characteristics. For example and without limitation, such characteristics may comprise quality of service (e.g., predicted or actual), data rate, noise level, bandwidth availability, historical failure rate, monetary cost, security level, general reliability, ability to communicate with communication devices in motion, and any of a large variety of characteristics that may be considered in deciding over which of a plurality of communication networks (or pathways) to communicate.

The CPSAM 150 may be adapted to determine such characteristics in any of variety of manners. For example and without limitation, the CPSAM 150 may be adapted to access information related to such characteristics stored in a memory (e.g., memory onboard the mobile communication device 100 or remote from the mobile communication device 100). Also for example, the CPSAM 150 may be adapted to determine actual characteristics by transmitting test messages and processing responses to the test messages. Additionally, for example, the CPSAM 150 may be adapted to determine predicted characteristics based, at least in part, on historical characteristics.

In addition to determining various characteristics related to a particular communication network (or pathways) and/or performing a particular type of communication over a particular communication network (or pathways), the CPSAM 150 may be adapted to process information of such characteristics to determine an aggregate metric.

In an exemplary scenario where the CPSAM 150 is adapted to determine an aggregate metric. Such an aggregate metric may be determined from a plurality of various characteristics associated with a particular communication network and/or particular type of communication over a particular communication network. As a non-limiting example, the CPSAM 150 may determine an aggregate metric based on an average or weighted average of various characteristics (e.g., cost, quality, data rate, reliability, robustness, etc.).

In a non-limiting exemplary scenario, a formula for determining an aggregate metric may be developed with user input. For example, a user may have previously established a profile of various criteria with the mobile communication device 100, in which the user assigned a first weighting factor to cost, a second weighting factor to quality and a third weighting factor to reliability. The CPSAM 150 may then calculate the aggregate metric utilizing the assigned weighting factors and the determined characteristics. Such a profile may also, for example, include limits on various characteristics (e.g., maximum acceptable cost, minimum acceptable quality or data rate, minimum acceptable reliability, etc.). The CPSAM 150 may also be adapted to consider such limits when determining an aggregate metric. Also for example, such a profile may comprise time considerations (e.g., time of day, day of week, etc.) to apply to the aggregate metric.

In addition to determining an aggregate metric, the CPSAM 150 may also, for example, be adapted to determine which communication network (or communication pathway) to utilize. The CPSAM 150 may be adapted to make such a determination in any of a variety of manners. For example and without limitation, the CPSAM 150 may be adapted to determine to utilize a particular communication network (or pathways) to perform a communication (e.g., of a particular type of communication) based on an aggregate metric, on a particular characteristic, particular characteristics limits, etc., as discussed previously. For example, the CPSAM 150 may be adapted to determine to utilize a particular communication network (or pathway) corresponding to the best aggregate metric.

The CPSAM 150 may then, for example, utilize the user interface module 140 to recommend a determined communication network (or pathway) to the user, or the CPSAM 150 may proceed directly with performing a desired communication over the determined communication network (or pathway) without further user interaction. In a scenario, where the CPSAM 150 utilizes the user interface module 140 to provide information to a user indicative of a recommended communication network (or pathway), the CPSAM 150 may also, for example, be adapted to provide information related to how the CPSAM 150 arrived at such a recommendation (e.g., best quality below cost threshold, best quality at any price, only link meeting minimum acceptable quality, etc.). The CPSAM 150 may additionally, for example, be adapted to provide information of viable alternatives (e.g., in case the user doesn't want to utilize the recommended communication network (or pathway) for some reason).

As mentioned previously, the CPSAM 150 may be adapted to provide assistance to a user in determining which of a plurality of communication networks (or pathways) to utilize (e.g., for performing a particular type of communication). The CPSAM 150 may, for example, be adapted to provide such assistance by interacting with the user of the mobile communication device 100. The CPSAM 150 may, for example, utilize the user interface module 140 for such user interaction.

For example, the CPSAM 150 may be adapted to utilize the user interface module 140 to present information describing various characteristics associated with communicating over a plurality of communication networks (or pathways). Such information may be output to a user to assist the user in determining which of the plurality of communication networks (or pathways) to utilize (e.g., to perform a particular type of communication). For example, the CPSAM 150 may utilize the user interface module 140 to present information of any of the previously mentioned characteristics related to particular communication networks or performing a communication of a particular type over particular communication networks (or pathways). A user may then analyze such information in determining which of the plurality of communication networks (or pathways) to utilize.

The CPSAM 150 may utilize the user interface module 140 to present such information to a user in a variety of manners, some of which were discussed previously. For example, the CPSAM 150 may utilize the user interface module 140 to present such information visually and/or audibly to a user. For example and without limitation, such information may be presented to a user in a color-coded manner (e.g., green associated with better and red associated with worse). Also for example, such information may be presented to a user graphically (e.g., utilizing bar graphs, pie charts, dials or other graphical features to represent degree). Additionally for example, such information may be presented to a user in an ordered list (e.g., of best to worse). Further for example, such information may be presented to user numerically (e.g., numeric indications of absolute or relative cost, quality, reliability, etc.). Still further for example, such information may be presented audibly (e.g., utilizing synthesized voice to tell a user about particular characteristics).

When a user has analyzed such information and determined which of the plurality of communication networks (or pathways) to utilize (e.g., for a particular communication or particular type of communication), the CPSAM 150 may be adapted to utilize the user interface module 140 to receive input information from the user regarding selection of at least one of the plurality of communication networks (or associated communication pathways) to utilize.

Various aspects of the CPSAM 150 (or related modules) may now be presented by way of non-limiting exemplary scenario. Such scenarios are merely for illustrative purposes and are not be construed to limit the scope of various aspects of the present invention.

In a first non-limiting exemplary scenario, the CPSAM 150 is adapted to determine communication quality associated with at least a plurality of available communication networks (or pathways) (e.g., a plurality of communication networks that are presently available for performing a particular type of communication). Such quality may, for example, reflect any one or more of quality of service, data rate, noise level, reliability, error rate, etc. The CPSAM 150 may, for example, be adapted to determine such quality via accessing stored quality information, predicting quality from historical performance, communicating test messages, etc. The CPSAM 150 is then adapted to utilize the user interface module 140 to output information regarding the communication quality to a user. For example, the user interface module 140 may present information to a user indicative of respective quality for a plurality of communication networks (or pathways). The user may then consider such information when determining which of the plurality of communication networks (or pathways) to utilize.

In a second non-limiting exemplary scenario, the CPSAM 150 is adapted to determine monetary information associated with at least a plurality of available communication networks (e.g., a plurality of communication networks that are presently available for performing a communication of a particular type). Such monetary information may, for example, comprise one or more of communication cost, overage fees, remaining minutes in a prepaid plan, marginal cost, cost per unit of information, etc. The CPSAM 150 may, for example, be adapted to determine such monetary information via accessing stored monetary information (e.g., remote and/or local) or by inquiry. The CPSAM 150 is then adapted to utilize the user interface module 140 to output monetary information. For example, the user interface module 140 may present information to a user indicative of respective monetary aspects associated with a plurality of communication networks. The user may then consider such information when determining which of the plurality of communication networks (or pathways) to utilize.

In a third non-limiting exemplary scenario, the CPSAM 150 is adapted to determine various characteristics associated with at least a plurality of available communication networks (or pathways) (e.g., a plurality of communication networks that are presently available for performing a communication of a particular type) and utilize such characteristics to calculate an aggregate recommendation metric. Such various characteristics may, for example, comprise quality, price and reliability. The CPSAM 150 may, for example, be adapted to determine such characteristics in any of a variety of manners and calculate the aggregate metric in accordance with a user-defined formula. The CPSAM 150 is then adapted to utilize the user interface module 140 to output information regarding the aggregate metric to a user. For example, the user interface module 140 may present information to a user indicative of respective aggregate metrics for a plurality of communication networks. The user may then consider such information when determining which of the plurality of communication networks (or pathways) to utilize.

As mentioned previously, the CPSAM 150 may be adapted to provide assistance to a user in determining which of a plurality of communication networks to utilize (e.g., for performing a communication of particular type). The CPSAM 150 may, for example, be adapted to provide such assistance without interacting with the user of the mobile communication device 100. In one exemplary scenario, the CPSAM 150 may, for example, be adapted to utilize the user interface module 140 to output information indicative of the determined communication network (or pathways), which may also comprise information indicative of the rationale for selecting the determined communication network (or pathways).

As discussed above, the CPSAM 150 may be adapted to determine which of the plurality of communication networks (or pathways) to utilize by obtaining and analyzing any of a variety of types of information related to various characteristics associated with communicating over the plurality of communication networks or associated communication pathways. For example, the CPSAM 150 may be adapted to communicate with one or more other networked devices (e.g., to request information or to test various communication link characteristics).

Also for example, the CPSAM 150 may be adapted to communicate with another communication device (e.g., a communication node with which the user desires to communicate) over a plurality of communication networks (or pathways) to determine characteristics of each of the plurality of networks (or pathways). Such characteristics may then be analyzed to determine which of the plurality of communication networks (or pathways) is preferred.

Further for example, the CPSAM 150 may be adapted to sequentially attempt to establish communication links over a plurality of communication networks (or pathways) until a communication link is successfully established. In a non-limiting exemplary scenario where three communication networks (or pathways) are potentially available for conducting a particular communication, the CPSAM 150 may be adapted to sequence through the three communication networks (or pathways), attempting to establish a communication link over each, until the desired communication link is successfully established.

The CPSAM 150 may, for example, be adapted to sequence through the plurality of communication networks (or pathways) in a particular order. In such a scenario, the CPSAM 150 may be adapted to determine the particular order as a function of any of a variety of communication network (or pathway) characteristics, many examples of which were discussed previously (e.g., quality, cost, data rate, error rate, reliability, aggregate metric, etc.). In such a scenario, the CPSAM 150 may thus first attempt to establish a communication link over a most preferred communication network (or pathway), followed by a next preferred communication network (or pathway) and so on, until a desired communication link is successfully established.

Still further for example, the CPSAM 150 may be adapted to concurrently attempt to establish communication links over a plurality of communication networks (or pathways) until a communication link is successfully established. Such a communication strategy may be employed, for example, to successfully establish a communication link over at least one of a plurality of communication networks (or pathways) in the most expeditious manner.

The CPSAM 150, and any of the communication modules of the mobile communication device 100, may be implemented in any of a variety of manners, some of which will be exemplified in FIGS. 2-5. For example, the CPSAM 150 may be implemented in hardware, software or a combination thereof. The CPSAM 150 may be implemented in any of a variety of degrees of integration (e.g., integrated in a single integrated circuit with other modules, as a stand-alone integrated circuit, etc.). Accordingly, the scope of various aspects of the present invention should not be limited by characteristics of any particular implementation or any particular degree of integration.

Figure 2:
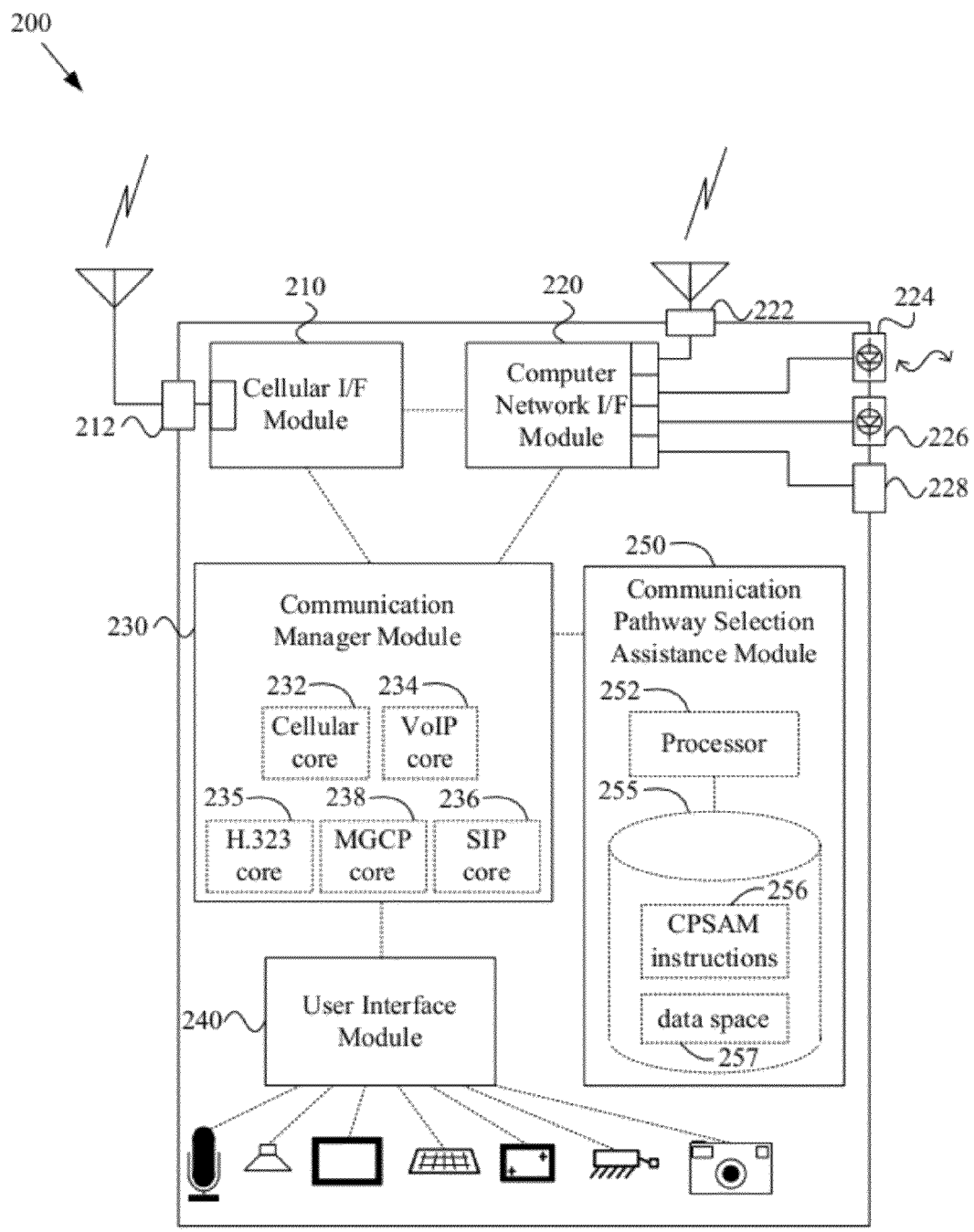
FIG. 2 is a block diagram illustrating another exemplary mobile communication device adapted to provide communication pathway determination assistance, in accordance with various aspects of the present invention.

FIG. 2 is a block diagram illustrating another exemplary mobile communication device 200 adapted to provide communication pathway determination assistance, in accordance with various aspects of the present invention. The exemplary mobile communication device 200 may, for example, share any or all characteristics with the exemplary mobile communication device 100 illustrated in FIG. 1 and discussed previously.

As mentioned previously, the communication manager module 230 may be adapted to generally manage communication functionality of the mobile communication device 200. In FIG. 2, the exemplary communication manager module 230 comprises (or interfaces with) various core modules related to voice conversation communication. For example, the communication manager module 230 may comprise a cellular core 232, a VoIP core 234, a H.323 core 235, a MGCP/MEGACO core 238 and a SIP core 236. The communication manager module 230 may utilize any of the voice conversation communication cores as needed. Note, exemplary VoIP communication is presented for illustrative purposes only and should not limit the scope of various aspects of the present invention to particular characteristics associated with VoIP communication.

Also, as mentioned previously, the user interface module 240 may comprise any of a variety of communication devices and/or interfaces therefor. For example, the user interface module 240 may comprise a microphone, speaker, display, keypad, touch screen, tactile output, camera and/or associated interfaces.

Additionally, as mentioned previously, the communication pathway selection assistance module 250 ("CPSAM") may be implemented in hardware, software or a combination thereof. The exemplary CPSAM 250 illustrated in FIG. 2 is implemented by a processor 252 executing CPSAM instructions 256 stored in a memory 255. The memory 255 is also illustrated with data space 257 that may be utilized for the storage of communication device information (e.g., for the mobile communication device 200 and/or other communication devices), communication network or pathway information, user information, general processing information, etc. Note that in executing the CPSAM instructions 256, the processor 252 may also interface with any of a variety of CPSAM support hardware and/or software modules.

Figure 3:
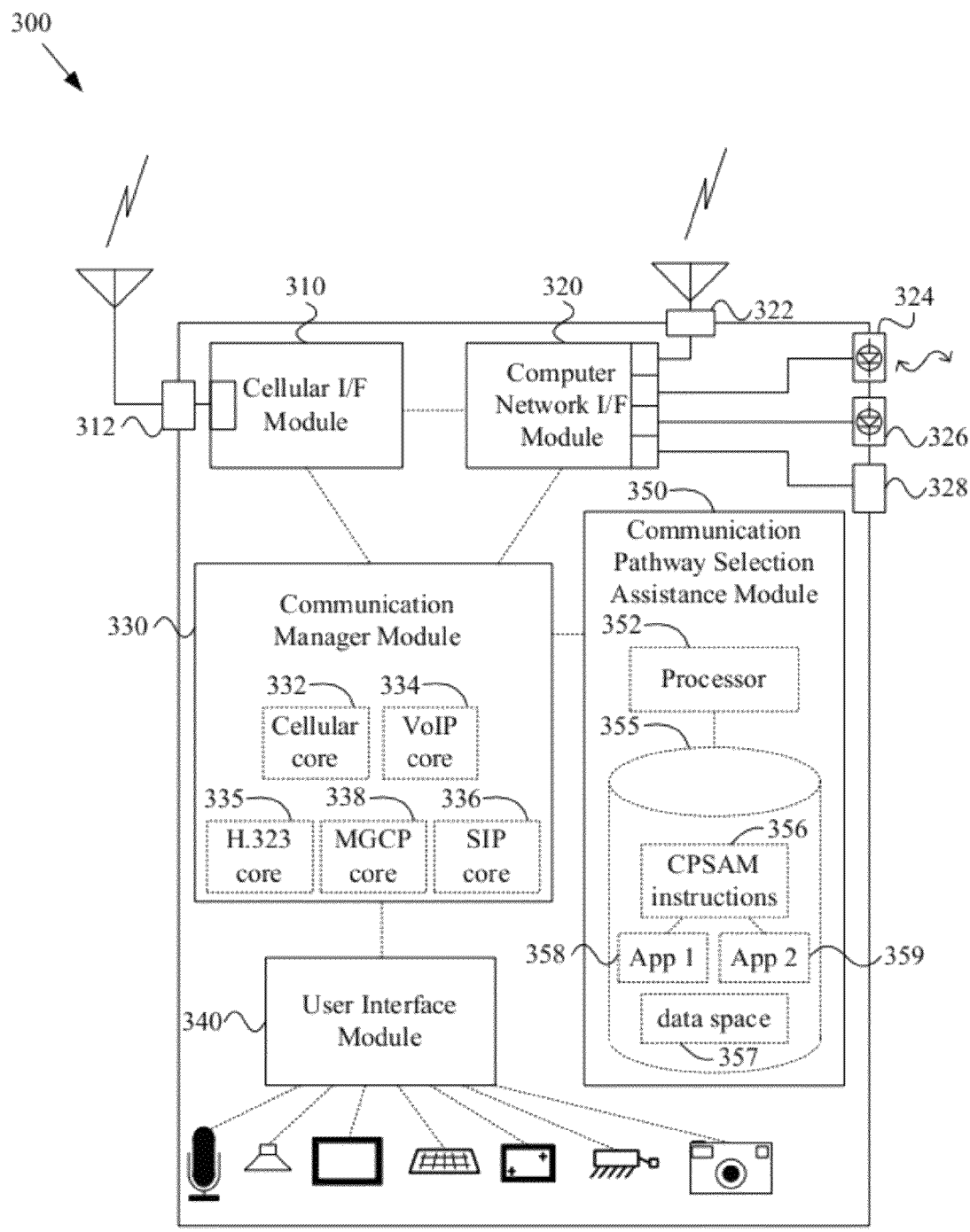
FIG. 3 is a block diagram illustrating an additional exemplary mobile communication device adapted to provide communication pathway determination assistance, in accordance with various aspects of the present invention.

FIG. 3 is a block diagram illustrating an additional exemplary mobile communication device 300 adapted to provide communication pathway determination assistance, in accordance with various aspects of the present invention. The exemplary mobile communication device 300 may, for example, share any or all characteristics with the exemplary mobile communication devices 100 and 200 illustrated in FIGS. 1-2 and discussed previously.

As mentioned previously, the CPSAM 350 may be implemented in hardware, software or a combination thereof. Also as discussed previously, the CPSAM 350 may be adapted to interface with any of a variety of other modules (e.g., hardware and/or software modules, the communication manager module 330, communication applications, etc.). In FIG. 3, the CPSAM 350 is implemented, at least in part, by a processor 352 executing CPSAM instructions 356 stored in a memory 355. The memory 355 is also illustrated with a first communication application 358 and a second communication application 359, which when executed by the processor 352, result in the processor 352 performing or managing respective communications associated with the executing applications (e.g., providing assistance in determining one or more communication networks and/or pathways for communication). The first and second communication applications 358 and 359 may, for example, utilize communication pathway selection assistance services provided by the processor 352 executing the CPSAM instructions 356. For example, the processor 352 may execute the CPSAM instructions 356 as an autonomous process or may execute particular CPSAM instructions 356 upon request (or invocation) by instructions of the first or second communication applications 358 and 359 also executing on the processor 352. In a non-limiting exemplary scenario, CPSAM instructions 356 may be mapped to locations to which the first and second communication applications 358 and 359 may link.

Figure 4:
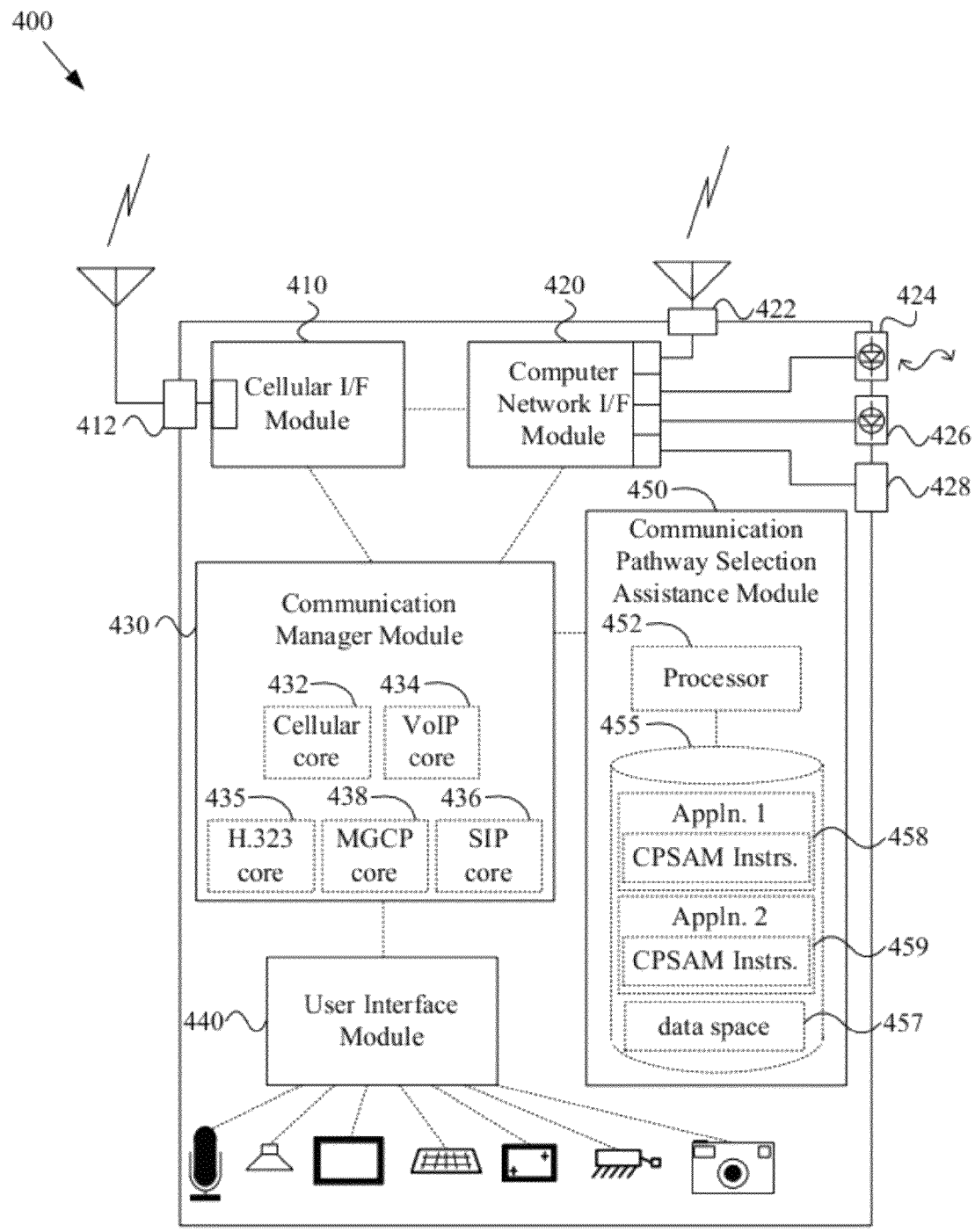
FIG. 4 is a block diagram illustrating still another exemplary mobile communication device adapted to provide communication pathway determination assistance, in accordance with various aspects of the present invention.

FIG. 4 is a block diagram illustrating still another exemplary mobile communication device 400 adapted to provide communication pathway determination assistance, in accordance with various aspects of the present invention. The exemplary mobile communication device 400 may, for example, share any or all characteristics with the exemplary mobile communication devices 100, 200 and 300 illustrated in FIGS. 1-3 and discussed previously.

As mentioned previously, the CPSAM 450 may be implemented in hardware, software or a combination thereof. Also as discussed previously, the CPSAM 450 may be adapted to interface with any of a variety of other modules (e.g., hardware and/or software modules, the communication manager module 430, communication applications, etc.). In FIG. 4, the CPSAM 450 is implemented by a processor 452 executing CPSAM instructions stored in a memory 455 as subroutines of a first communication application 458 and a second communication application 459. Execution of the first and second communication applications 458 and 459 by the processor 452, results in the processor 452 performing respective communications associated with the executing applications 458 and 459, which includes implementation of various CPSAM instructions embedded in the applications 458 and 459. The first and second communication applications 458 and 459 may, for example, utilize communication pathway selection assistance services provided by the processor 452 executing the CPSAM instructions embedded within the applications 458 and 459. Software instructions corresponding to various CPSAM functions may, for example, be published as library routines for incorporation into applications developed to execute on the mobile communication device 400.

Figure 5:
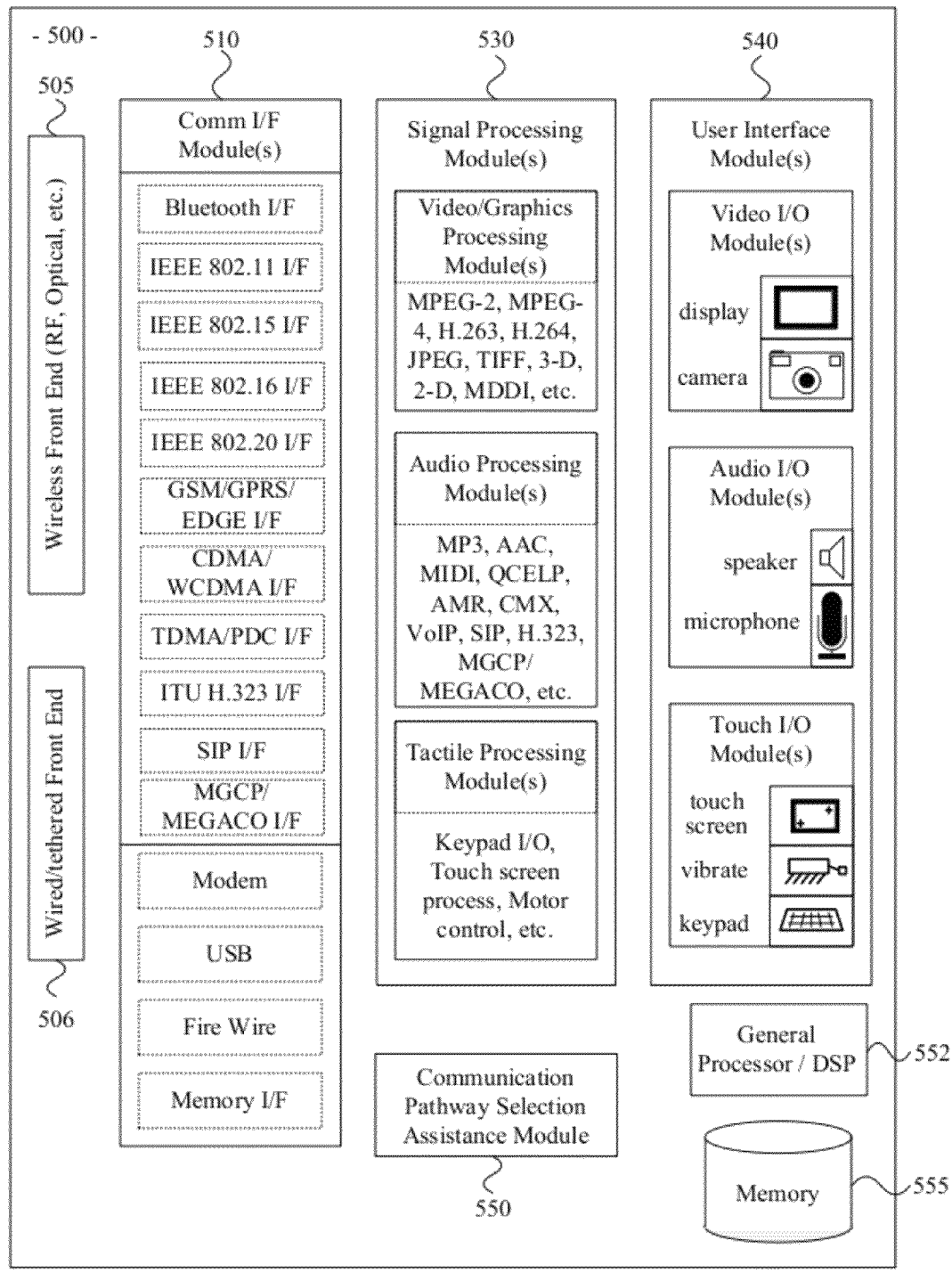
FIG. 5 is a block diagram illustrating yet another exemplary mobile communication device adapted to provide communication pathway determination assistance, in accordance with various aspects of the present invention.

FIG. 5 is a block diagram illustrating yet another exemplary mobile communication device 500 adapted to provide communication pathway determination assistance, in accordance with various aspects of the present invention. The exemplary mobile communication device 500 may, for example, share any or all characteristics with the exemplary mobile communication devices 100-400 illustrated in FIGS. 1-4 and discussed previously.

The exemplary mobile communication device 500 may comprise a wireless front end 505 and/or a wired/tethered front end 506. The wireless front end 505 and the wired/tethered front end 506 may be communicatively coupled to any of a variety of communication interface modules 510. The exemplary mobile communication device 500 is illustrated with a non-limiting exemplary set of communication interface modules 510, including: a Bluetooth interface module, IEEE 802.11 interface module, IEEE 802.15 interface module, IEEE 802.16 interface module, IEEE 802.20 interface module, GSM/GPRS/EDGE interface module, CDMA/WCDMA interface module, TDMA/PDC interface module, H.323 interface module, SIP interface module, MGCP/MEGACO interface module, modem module, USB module, fire wire module and memory interface module (e.g., for interfacing with off-board or removable memory). The wireless front end 505, wired/tethered front end 506 and communication interface modules 510 may, for example and without limitation, share any or all characteristics with the communication interface module(s) 110, 120, 210, 220, 310, 320, 410 and 420 of the exemplary mobile communication devices 100-400 illustrated in FIGS. 1-4 and discussed previously.

The exemplary mobile communication device 500 may also comprise any of a variety of user interface module(s) 540. The user interface module(s) 540 may, for example and without limitation, share any or all characteristics with the user interface module(s) 140, 240, 340 and 440 of the exemplary mobile communication devices 100-400 illustrated in FIGS. 1-4 and discussed previously. The exemplary mobile communication device 500 is illustrated with a non-limiting exemplary set of user interface module(s) 540 (or sub-modules). The user interface module(s) 540 may, for example, comprise any of a variety of video/graphics processing modules, audio processing modules, and tactile signal processing modules. The mobile communication device 500 may also comprise compatible user interface devices corresponding to the various user interface module(s) 540 (e.g., a video display, camera, speaker, microphone, touch screen, keypad, vibrator, etc.).

The exemplary mobile communication device 500 is illustrated with a non-limiting exemplary set of signal processing modules 530, which may be selectively utilized in accordance with current signal processing needs. The signal processing modules 530 may, for example, comprise various video, audio, textual and tactile signal-processing modules. The signal processing modules 530 may generally, for example, process information conveyed between the front ends 505 and 506 and communication interface module(s) 510 of the mobile communication device 500 and the user interface module(s) 540 of the mobile communication device 500.

The signal processing modules 530 may, for example and without limitation, comprise various video/graphics processing modules, various audio processing modules (e.g., VoIP processing modules) and various tactile processing modules. The signal processing modules 530 may, for example, share any or all characteristics with the communication manager modules 130, 230, 330 and 430 illustrated in FIGS. 1-4 and discussed previously.

The exemplary mobile communication device 500 may also comprise a communication pathway selection assistance module 550 ("CPSAM"). The CPSAM 550 may, for example, share any or all characteristics with the CPSAMs 150, 250, 350 and 450 discussed previously and various exemplary components thereof. The CPSAM 550 may, for example, interface with (or utilize) any of the communication interface modules 510, user interface modules 540 or signal processing modules 530.

The exemplary mobile communication device 500 may also comprise a general processor 552 (and/or a digital signal processor) and on-board memory 555. The general processor 552, which may, for example, be a baseband processor, and memory 555 may perform any of a wide variety of operational tasks for the mobile communication device 500. For example and without limitation, the general processor 552 and memory 555 may share various characteristics with the communication interface modules, communication manager modules, CPSAMs and user interface modules of the exemplary mobile communication devices 100-400 illustrated in FIGS. 1-4 and discussed previously.

Figure 6:
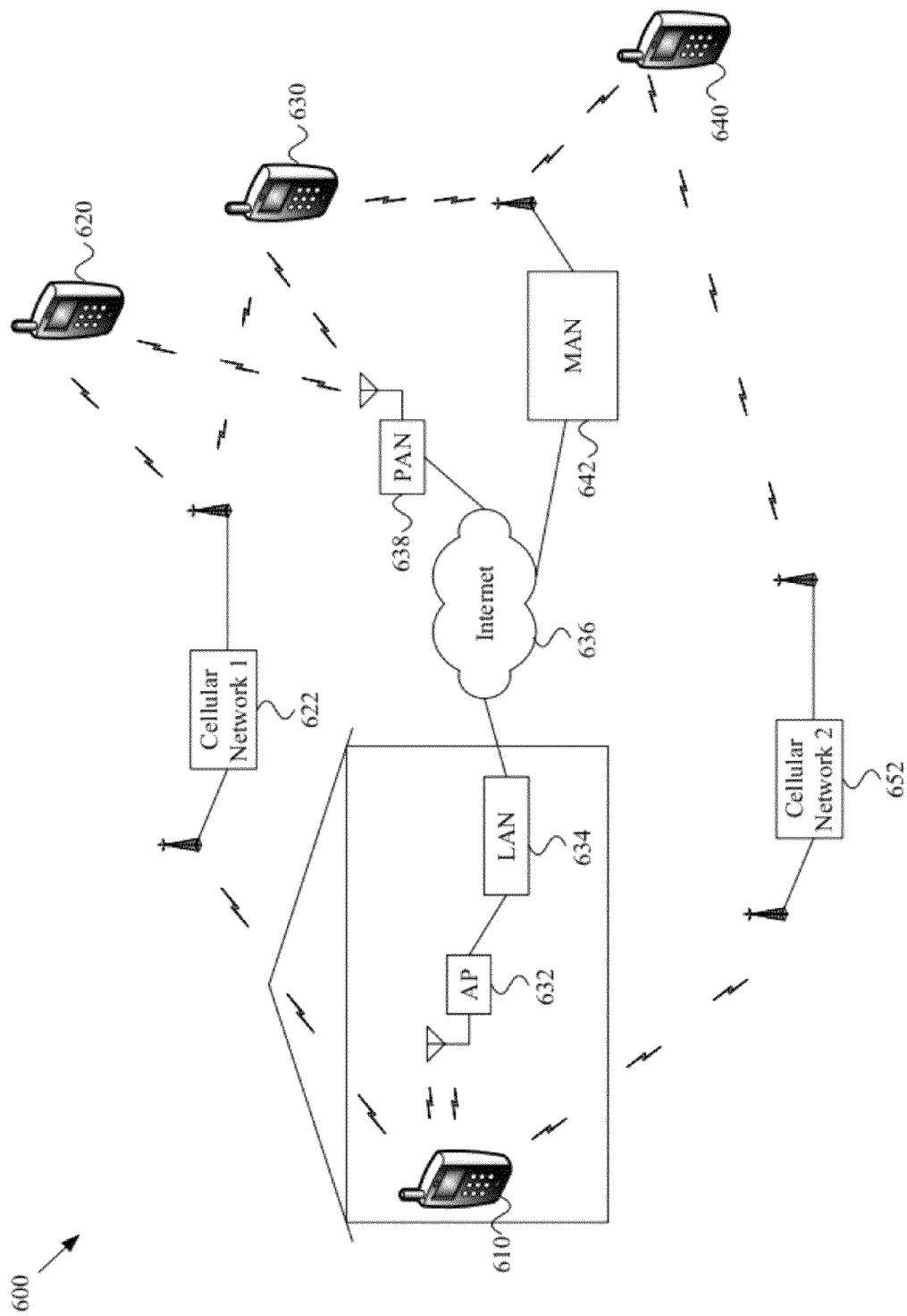
FIG. 6 is an exemplary communication environment in which a mobile communication device incorporating various aspects of the present invention might operate.

FIG. 6 is an exemplary communication environment 600 in which a mobile communication device incorporating various aspects of the present invention might operate. The exemplary communication environment 600 will be discussed below in the context of voice conversation communication. However, various aspects of the present invention should not be limited by particular characteristics of voice conversation communication.

In the exemplary communication environment 600, voice conversation communication may be conducted between the first mobile communication device 610 ("MCD") and the second MCD 620 through a first communication pathway comprising the first cellular network 622. Also, voice conversation communication may be conducted between the first MCD 610 and the second MCD 620 through a second communication pathway comprising the LAN 634 and the Internet 636. Note that in communicating with the second MCD 620 through the first communication pathway, the first MCD 610 communicates directly with the first cellular network 622, and in communicating with the second MCD 620 through the second communication pathway, the first MCD 610 communicates directly with the LAN 634 through the LAN access point 632.

Additionally, voice conversation communication may be conducted between the first MCD 610 and the third MCD 630 through a third communication pathway comprising the first cellular network 622, through a fourth communication pathway comprising the LAN 634, the Internet 636 and the PAN 638, and through a fifth communication pathway comprising the LAN 634, the Internet 636 and the MAN 642. Note that in communicating with the third MCD 630 through the third communication pathway, the first MCD 610 communicates directly with the first cellular network 622. Also note that in communicating with the third MCD 630 through the fourth and fifth communication pathways, the first MCD 610 communicates directly with the LAN 634 through the LAN access point 632.

Further, voice conversation communication may be conducted between the first MCD 610 and the fourth MCD 640 through a sixth communication pathway comprising the LAN 634, Internet 636 and MAN 642, and a seventh communication pathway comprising the second cellular network 652. Note that in communicating with the fourth MCD 640 through the sixth communication pathway, the first MCD 610 communicates directly with the LAN 634 through the LAN access point 632, and in communicating with the fourth MCD 640 through the seventh communication pathway, the first MCD 610 communicates directly with the second cellular network 652.

In the exemplary scenario, the first MCD 610 (e.g., a CPSAM thereof) may determine the availability of the various communication networks (or pathways) for conducting voice conversation communication between the first MCD 610 and the other MCDs 620, 630 and 640. Various manners of making such a determination were presented previously. Also in the exemplary scenario, the first MCD 610 (e.g., a CPSAM thereof) may determine various characteristics associated with conducting voice conversation communication between the first MCD 610 and the other MCDs 620, 630 and 640. Various examples of such characteristics and manners of determining such characteristics were presented previously. For example, such characteristics may comprise communication quality, cost, error rate, data rate, etc. The first MCD 610 may also, as discussed previously, calculate aggregate metrics associated with conducting voice conversation over the various communication pathways (or networks).

The first MCD 610 may provide assistance to a user of the MCD 610 in determining which communication pathway (or network) to utilize to conduct a particular voice conversation communication. For example, as discussed previously, a CPSAM of the first MCD 610 may utilize a user interface module of the first MCD 610 to present various types of information to the user, where such information is representative of various characteristics associated with conducting a voice conversation communication over various communication pathways (or networks). A user of the first MCD 610 may then consider such information when determining which communication pathway (or network) to utilize. Also for example, as discussed previously, a CPSAM of the first MCD 610 may automatically, without user interaction, determine the communication pathway (or network) to utilize.

Various aspects of the present invention will now be illustrated by way of non-limiting exemplary scenario. Such scenarios are merely illustrative and should not be construed to limit the scope of various aspects of the present invention in any way.

In a first non-limiting exemplary scenario, a user of the first MCD 610 desires to conduct a voice conversation communication with a user of the second MCD 620. The user may, for example, indicate such a desire to the first MCD 610 through a user interface module of the first MCD 610. The first MCD 610 may then, in turn, provide assistance to the user in determining which of a plurality of communication networks (or pathways) to utilize for the desired communication.

For example, the first MCD 610 (e.g., a CPSAM thereof) may determine availability of various communication networks or pathways over which the desired communication may be conducted. For example, the first MCD 610 may determine that the first cellular network 622 associated with the first communication pathway and the LAN 634 associated with the second communication pathway are presently available. Additionally, or alternatively, the first MCD 610 may determine that the first communication pathway to the second MCD 620 and the second communication pathway (including all communication networks thereof) to the second MCD 620 are each presently available for conducting the desired communication.

As discussed previously with regard to various exemplary mobile communication devices, the first MCD 610 may be adapted to determine availability of various communication networks or pathways in any of a variety of manners (e.g., accessing stored information, communicating test messages, etc.). In the first non-limiting exemplary scenario, the first MCD 610 communicates with the first cellular network 622 over a control-access-channel to determine that the first communication pathway is presently available, and the first MCD 610 communicates a test message (e.g., utilizing a known IP address of the second MCD 620) to the second MCD 620 to determine that the second communication pathway is presently available.

The first MCD 610 may determine various characteristics associated with conducting the desired voice communication with the second MCD 620 over the first and second communication pathways (or corresponding networks). For example, the first MCD 610 may retrieve from memory information regarding typical quality and pricing associated with the first communication pathway. The first MCD 610 may also determine expected quality associated with the second communication pathway by communicating test messages and determine cost by accessing information stored in memory of the first MCD 610).

The first MCD 610 (e.g., a CPSAM utilizing a user interface module) may then present the quality and pricing information to the user of the first MCD 610 to enable the user of the first MCD 610 to make an informed decision when determining which of the first and second communication pathways to utilize. The user of the first MCD 610 may then determine the desired communication pathway(s) and notify the first MCD 610 of the determination (e.g., through the user interface of the first MCD 610.

In a second non-limiting exemplary scenario, a user of the first MCD desires to conduct a voice conversation communication with a user of the third MCD 630. The user may, for example, indicate such a desire to the first MCD 610 through a user interface module of the first MCD 610. The first MCD 610 may then, in turn, provide assistance to the user in determining which of a plurality of communication networks (or pathways) to utilize for the desired communication.

For example, the first MCD 610 (e.g., a CPSAM thereof) may determine availability of various communication networks or pathways over which the desired communication may be conducted. For example, the first MCD 610 may determine that the first cellular network 622 associated with the third communication pathway and the LAN 634 associated with the fourth and fifth communication pathways are presently available. Additionally, or alternatively, the first MCD 610 may determine that the third, fourth and fifth communication pathways to the third MCD 630 are each presently available for conducting the desired communication.

As discussed previously with regard to various exemplary mobile communication devices, the first MCD 610 may be adapted to determine availability of various communication networks or pathways in any of a variety of manners (e.g., accessing stored information, communicating test messages, etc.). In the second non-limiting exemplary scenario, the first MCD 610 communicates with the first cellular network 622 over a control-access-channel to determine that the third communication pathway to the third MCD 630 is presently available, the first MCD 610 communicates a test message (e.g., utilizing a known IP address of the third MCD 630) to the third MCD 630 to determine that the second communication pathway to the third MCD 630 is presently available, and the first MCD 610 accesses registration information associated with the MAN 642 to determine that the third communication pathway to the third MCD 630 is presently available.

The first MCD 610 may determine various characteristics associated with conducting the desired voice conversation communication with the third MCD 630 over the third, fourth and fifth communication pathways (or corresponding networks). For example, the first MCD 610 may retrieve from a database associated with the first cellular network 622 information regarding present bandwidth availability and pricing associated with the first communication pathway. The first MCD 610 may also determine quality associated with the fourth communication pathway by communicating test messages and determine cost by accessing information stored in memory of the first MCD 610. The first MCD 610 may additionally determine quality associated with the fifth communication pathway by exchanging test messages with the third MCD 630 and determine cost associated with the fifth communication pathway by accessing information stored in local memory and asking the third MCD 630 for cost information. Further, the first MCD 610 may communicate with the third MCD 630 to determine communication network/pathway preferences of the third MCD 630.

The first MCD 610 may then process the link quality, cost and preference information to determine an aggregate metric corresponding to each available communication pathway. For example, such an aggregate metric may be based on a user-defined weighted averaging of the various characteristics. In the second exemplary scenario, the first MCD 610 calculates the aggregate metric with the heaviest weighting associated with communication quality and utilizes preference information from the third MCD 630 to decide between the two communication pathways associated with the two highest aggregate metrics.

The first MCD 610 (e.g., a CPSAM utilizing a user interface module) may then present the aggregate metric information to the user of the first MCD 610 (e.g., in the form of a recommendation and/or an ordered list) to enable the user of the first MCD 610 to make an informed decision when determining which of the first and second communication pathways to utilize. The user of the first MCD 610 may then determine the desired communication pathway(s) and notify the first MCD 610 of the determination (e.g., through the user interface of the first MCD 610).

In response to the user input indicative of the determined communication network or pathway, the first MCD 610 may then attempt to establish a voice conversation communication link with the third MCD 630 over the user-selected communication network or pathway. If, for example, the first MCD 610 fails to establish the desired communication link, the first MCD 610 may then either solicit additional user direction as to which pathway to try next or may automatically, without further user interaction, attempt to establish a communication link over a next preferred communication pathway and proceed down a list of communication pathways until the desired communication link is successfully established.

In a third non-limiting exemplary scenario, a user of the first MCD 610 desires to conduct a voice conversation with a user of the fourth MCD 640. The user may, for example, indicate such a desire to the first MCD 610 through a user interface module of the first MCD 610. The first MCD 610 may then, in turn, provide assistance to the user in determining which of a plurality of communication networks (or pathways) to utilize for the desired communication.

For example, the first MCD 610 (e.g., a CPSAM thereof) may determine availability of various communication networks or pathways over which the desired communication may be conducted. For example, the first MCD 610 may determine that the LAN 634 associated with the sixth communication pathway and the second cellular network 652 associated with the seventh communication pathway are presently available. Additionally, or alternatively, the first MCD 610 may determine that the sixth and seventh communication pathways to the fourth MCD 640 are each presently available for conducting the desired communication.

As discussed previously with regard to various exemplary mobile communication devices, the first MCD 610 may be adapted to determine availability of various communication networks or pathways in any of a variety of manners (e.g., accessing stored information, communicating test messages, etc.). In the third non-limiting exemplary scenario, the first MCD 610 communicates a test message (e.g., utilizing a known IP address of the fourth MCD 640) to the fourth MCD 640 to determine that the sixth communication path to the fourth MCD 640 is presently available and communicates another test message to the fourth MCD 640 over the second cellular network 652 to determine that the seventh communication path to the fourth MCD 640 is presently available. Note that the first MCD 610 may also have determined that various other communication networks or pathways were not available, so no further activity with regard to such communication networks or pathways is needed (e.g., other than, perhaps, notifying the user of the first MCD 610 that such networks or pathways are presently unavailable).

The first MCD 610 may determine various characteristics associated with conducting the desired voice communication with the fourth MCD 640 over the sixth and seventh communication pathways (or corresponding networks). For example, the first MCD 610 may determine quality information associated with each of the sixth and seventh communication pathways by communicating test messages with the fourth MCD 640 over the sixth and seventh communication pathways (e.g., unbeknownst to the users of the first MCD 610 and fourth MCD 640).

The first MCD 610 may then process the link quality to determine whether the respective link qualities associated with the sixth and seventh communication pathways exceed a minimum quality threshold (e.g., as specified by the user). In the third exemplary scenario, both respective communication qualities associated with the sixth and seventh communication pathways exceed the minimum quality threshold, and thus, either communication pathway may be utilized.

The first MCD 610 may then automatically, without interacting with the user, determine to utilize whichever of the sixth and seventh communication pathways results in the most expeditious communication link establishment. For example, the first MCD 610 may concurrently attempt to establish communication links with the fourth MCD 640 over each of the sixth and seventh communication pathways. The first MCD 610 may then utilize the first successfully established communication link. Alternatively, the first MCD 610 may also utilize communication links over both of the sixth and seventh communication pathways (e.g., for redundancy or higher data rate). Continuing the third exemplary scenario, the communication link over the seventh communication pathway (i.e., through the second cellular network 652) is the first communication link established, so the first MCD 610 determines to utilize the seventh communication pathway (or second cellular network 652) to conduct the desired voice conversation communication with the fourth MCD 640.

The exemplary mobile communication devices 100-500, 610, 620, 630 and 640 illustrated in FIGS. 1-6 and discussed previously were presented to provide non-limiting exemplary illustrations of various aspects of the present invention. Accordingly, the scope of various aspects of the present invention should not be limited by characteristics of the exemplary mobile communication devices.

Various aspects of the present invention have been described above with the aid of functional building blocks illustrating the performance of certain significant functions. The boundaries of these functional building blocks and relationships between various functional building blocks have been arbitrarily defined for convenience of description. Alternate boundaries or relationships could be defined so long as the certain significant functions are appropriately performed. Such alternate boundaries or relationships are thus within the scope and spirit of the claimed invention. Additionally, the functional building blocks, and other illustrative blocks, modules and components herein, can be implemented as illustrated or by discrete components, application specific integrated circuits, processors executing appropriate software and the like or any combination thereof.

Figure 7:
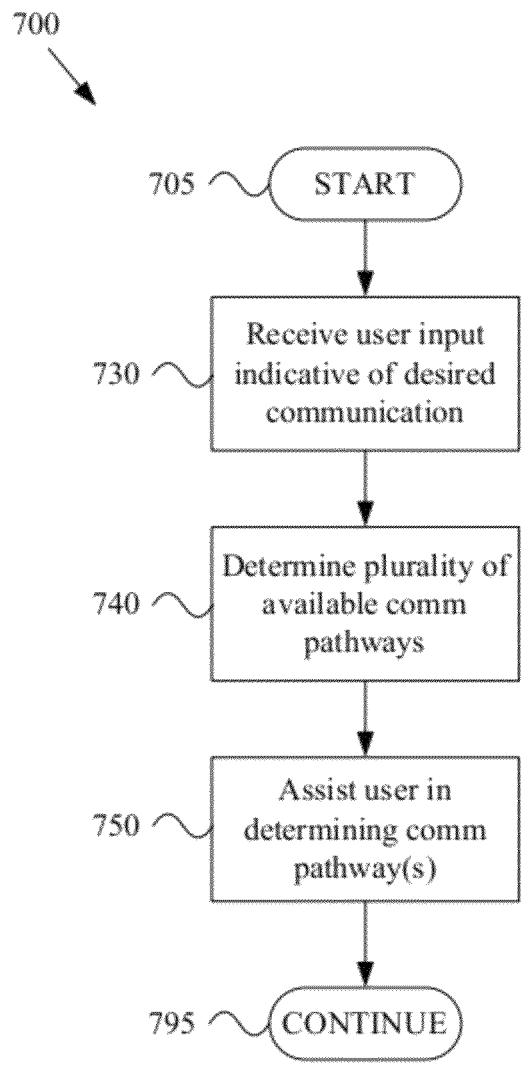
FIG. 7 is an exemplary method, in a mobile communication device, for providing communication pathway determination assistance, in accordance with various aspects of the present invention.

FIG. 7 is an exemplary method 700, in a mobile communication device, for providing communication pathway determination assistance, in accordance with various aspects of the present invention. The exemplary method 700 may, for example, share any or all functional characteristics with the exemplary mobile communication devices 100, 200, 300, 400, 500, 610, 620, 630 and 640 illustrated in FIGS. 1-6 and discussed previously.

A mobile communication device may, for example, implement the exemplary method 700. Such a mobile communication device may comprise characteristics of any of a variety of types of mobile communication devices, non-limiting examples of which were presented previously. The mobile communication device may, for example, be capable of conducting a particular type of communication over any of a plurality of communication networks.

The exemplary method 700 may begin executing at step 705. The exemplary method 700 may begin executing in response to any of a variety of causes or conditions. For example, the exemplary method 700 may begin executing in response to a power-up or reset condition of a mobile communication device implementing the method 700. Also for example, the exemplary method 700 may begin executing in response to a user input indicating the user would like to initiate a communication and/or explore various communication options.

The exemplary method 700 may, at step 730, comprise receiving a user input indicative of a desired communication (e.g., a desired communication with a particular other communication node using a particular type of communication).

Step 730 may, for example and without limitation, share any or all functional characteristics with the exemplary user interface modules 140, 240, 340, 440 and 540 illustrated in FIGS. 1-6 and discussed previously.

Step 730 may comprise receiving a user input indicative of a desired communication in any of a variety of manners. For example and without limitation, step 730 may comprise receiving a user selection of an indicium (e.g., a visual indicium) corresponding to a desired communication. Such a desired communication may, for example, correspond to performing a particular type of communication with a particular other communication node (or device) over a particular communication network (or pathway). Many non-limiting examples of such user interaction were presented previously.

The exemplary method 700 may, at step 740, comprise determining which of a plurality of communication networks and/or pathways are presently available and/or are presently available for performing the desired communication. Step 740 may, for example, share any or all functional characteristics with the CPSAMs 150, 250, 350, 450 and 550 illustrated in FIGS. 1-6 and discussed previously.

Step 740 may comprise determining the availability of various communication networks and/or communication pathways in any of variety of manners. For example and without limitation, step 740 may comprise accessing information stored in a memory (e.g., information stored locally and/or remotely) and processing such access information to determine which of the plurality of communication networks are presently available and/or available for performing the desired communication (e.g., a desired voice conversation communication).

Step 740 may also, for example, comprise communicating test messages with various communication network nodes. In such a scenario, step 740 may comprise processing response messages (if received) corresponding to various test messages to determine availability of various communication networks and/or pathways.

The exemplary method 700 may, at step 750, comprise providing assistance to a user in determining which of a plurality of communication networks to utilize for a communication. For example, step 750 may comprise providing assistance to a user in determining which of a plurality of communication pathways to utilize for performing a particular communication (e.g., of a particular type of communication) with a particular other communication node. Step 750 may, for example and without limitation, share any or all characteristics with the exemplary CPSAMs 150, 250, 350, 450 and 550 illustrated in FIGS. 1-6 and discussed previously.

Step 750 may comprise providing such user assistance in any of a variety of manners. For example and without limitation, step 750 may comprise interacting with a user to determine which of a plurality of communication pathways (or networks) to utilize or may comprise determining which of a plurality of communication pathways (or networks) to utilize automatically without further user interaction.

For example, step 750 may comprise determining various information that may be utilized (e.g., by a user or an automated process) to compare performing a desired communication (e.g., of a particular type of communication) over a plurality of communication networks or pathways (e.g., two or more of a plurality of communication networks that are presently or potentially available for performing a desired communication).

Step 750 may comprise determining such information in any of a variety of manners, non-limiting examples of which were discussed previously with regard to FIGS. 1-6. For example and without limitation, step 750 may comprise accessing information in local or remote memory. Also for example, step 750 may comprise communicating test or inquiry messages with various communication network nodes or databases.

Step 750 may also, for example, comprise processing various types of information to determine an aggregate metric or to make a recommendation of a particular communication network (or networks). Step 750 may comprise processing such information in accordance with a user-defined formula or profile (e.g., including various user-specified criteria).

Such information, as discussed previously, may comprise any of a variety of types of information. For example and without limitation such information may comprise information of communication link quality, cost, error rate, data rate, reliability, an aggregate metric, etc. Also for example, such information may comprise a recommendation of a particular communication pathway (or network).

As mentioned previously, step 750 may also comprise outputting information of various characteristics of communication pathways or networks to a user (e.g., for the user to consider in determining which of the communication pathways or networks to utilize). Step 750 may comprise outputting such information in any of a variety of manners, non-limiting examples of which were presented previously in the discussion of FIGS. 1-6. For example and without limitation, step 750 may comprise outputting such information utilizing various visual and/or audio indicia.

Step 750 may then, for example, comprise receiving input information from a user regarding selection of at least one of the plurality of communication pathways (or networks) for performing a desired communication.

As discussed previously, step 750 may, for example, comprise determining which of a plurality of communication pathways (or networks) to utilize automatically without user interaction. Step 750 may comprise automatically determining which of a plurality of communication pathways (or networks) to utilize in any of a variety of manners.

For example, step 750 may comprise determining a recommended communication network or pathway based on determined communication path characteristics and utilizing such a recommended communication network or pathway without interaction with the user. Also for example, step 750 may comprise determining a set of potential communication pathways (or networks) to utilize and sequencing through the set of potential communication pathways (or networks) until a communication link is successfully established. Such a set of potential communication pathways (or networks) may comprise characteristics of an ordered list of communication pathways (or networks) ordered by preference (e.g., ordered from most preferred to least preferred). Further for example, step 750 may comprise determining a set of potential communication pathways (or networks) to utilize, concurrently attempting to establish communication links over the set of potential communication pathways (or networks), and determining to utilize the first successfully established communication link(s).

The exemplary method 700 may, at step 795, comprise performing continued processing. Step 795, and any continued processing step herein, may comprise characteristics of any of a variety of continued processing activities. For example, step 795 may comprise conducting the desired communication for the user. Step 795 may further, for example, comprise further communicating with the user to additionally refine the communication pathway (or network) determination. Also, step 795 may comprise continuing to monitor characteristics associated with various communication pathways or networks and providing information to a user in particular circumstances (e.g., recommending a change to a different communication pathway or notifying the user of a potentially superior communication pathway to utilize).

Figure 8:
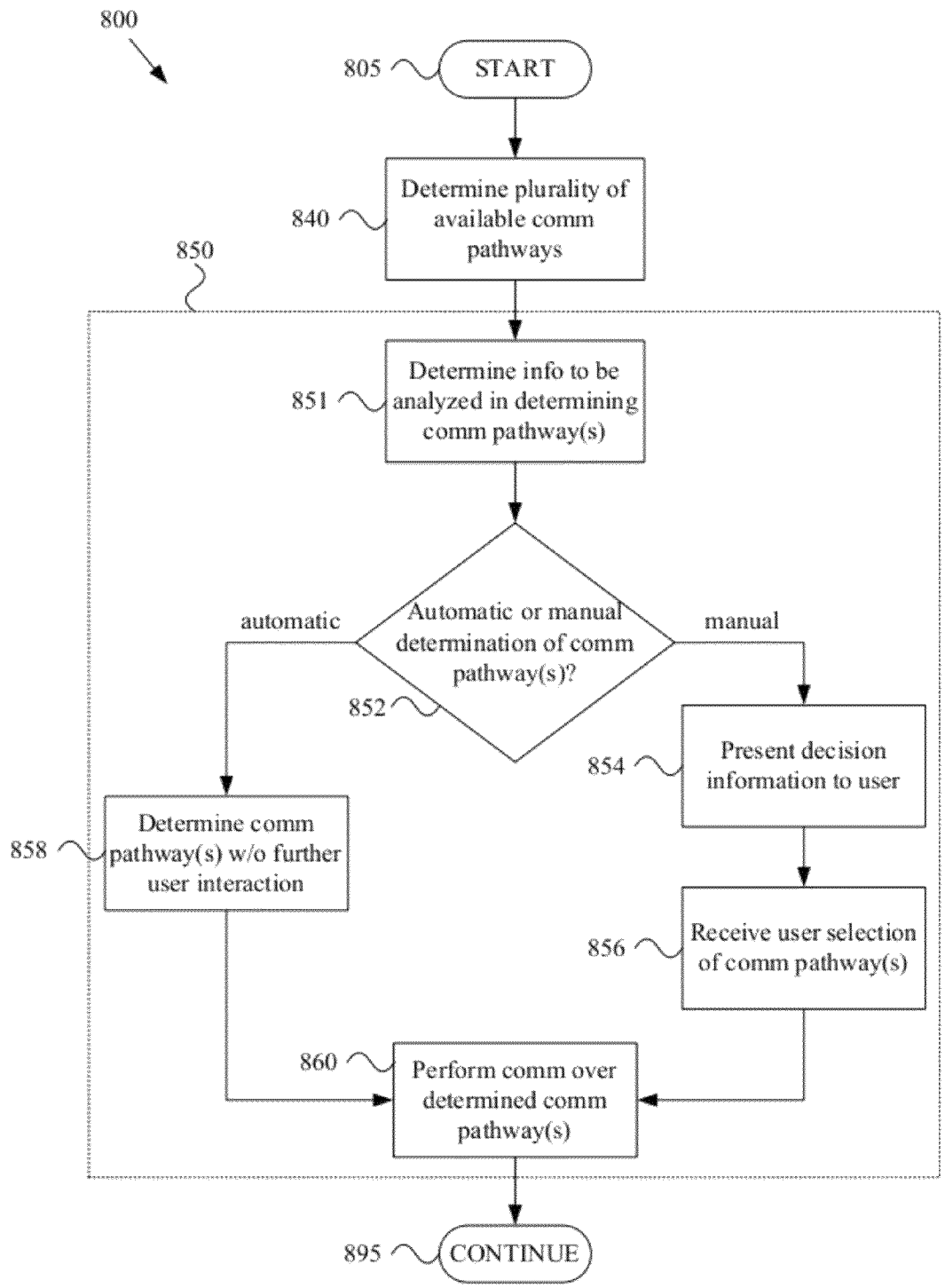
FIG. 8 is an exemplary method, in a mobile communication device for providing communication pathway determination assistance, in accordance with various aspects of the present invention.

FIG. 8 is an exemplary method 800, in a mobile communication device for providing communication pathway determination assistance, in accordance with various aspects of the present invention. The exemplary method 800 may, for example and without limitation, share any or all characteristics with the exemplary method 700 illustrated in FIG. 7 and discussed previously. The exemplary method 800 may also, for example, share any or all functional characteristics with the exemplary mobile communication devices 100, 200, 300, 400, 500, 610, 620, 630 and 640 illustrated in FIGS. 1-6 and discussed previously.

A mobile communication device may, for example, implement the exemplary method 800. Such a mobile communication device may comprise characteristics of any of a variety of types of mobile communication devices, non-limiting examples of which were presented previously. The mobile communication device may, for example, be capable of conducting a particular type of communication over any of a plurality of communication networks.

The exemplary method 800 may begin executing at step 805. The exemplary method 800 may begin executing in response to any of a variety of causes or conditions. For example, the exemplary method 800 may begin executing in response to a power-up or reset condition of a mobile communication device implementing the method 800. Also for example, the exemplary method 800 may begin executing in response to a user input indicating the user would like to initiate a communication and/or explore various communication options (e.g., by perusing a directory).

The exemplary method 800 may, at step 840, comprise determining which of a plurality of communication networks and/or pathways are presently available and/or presently available for performing a desired communication (e.g., a desired communication of a particular type of communication). Step 840 may share any or all characteristics with step 740 of FIG. 7, discussed previously, and may share any or all functional characteristics with the exemplary CPSAMs 150, 250, 350, 450 and 550 illustrated in FIGS. 1-6 and discussed previously.

The exemplary method 800 may, at step 850, comprise providing assistance to a user in determining which of the first plurality of communication networks to utilize for communication. For example, step 850 may comprise providing assistance to a user in determining which of a plurality of communication pathways to utilize for performing a communication (e.g., of a particular type of communication) with a particular other communication node. Step 850 may, for example and without limitation, share any or all characteristics with step 750 of FIG. 7 and may share any or all functional characteristics with the exemplary CPSAMs 150, 250, 350, 450 and 550 illustrated in FIGS. 1-6 and discussed previously.

Step 850 may comprise providing such user assistance in any of a variety of manners. For example and without limitation, step 850 may comprise interacting with a user to determine which of a plurality of communication pathways to utilize or may comprise determining which of a plurality of communication pathways to utilize automatically without further user interaction.

Step 850 may, for example at sub-step 851, comprise determining various information that may be utilized (e.g., by a user or an automated process) to compare performing a desired communication (e.g., of a particular type of communication) over a plurality of communication networks or pathways (e.g., two or more or a plurality of communication networks that are presently or potentially available for performing a desired communication). Various non-limiting examples of such information and/or manners of obtaining or determining such information were presented previously.

Step 850 may, for example at sub-step 852, comprise directing execution flow of the exemplary method 800. For example, in a scenario where the mobile communication device implementing the exemplary method 800 assists a user in determining a communication pathway or network by automatically determining such a communication without further user interaction, sub-step 852 may comprise directing execution flow of the exemplary method 800 to step 858. Alternatively for example, in a scenario where the mobile communication device assists a user in determining a communication pathway or network by providing various pathway or network information to a user for the user to consider in determining a communication pathway or network, sub-step 852 may comprise directing execution flow of the exemplary method 800 to step 854.

Step 850 may, for example at sub-step 854, comprise outputting information of various characteristics of communication pathways or networks to a user (e.g., for the user to consider in determining which of the communication pathways or networks to utilize). Sub-step 854 may comprise outputting such information in any of a variety of manners, non-limiting examples of which were presented previously in the discussion of FIGS. 1-7. For example and without limitation, sub-step 854 may comprise outputting such information utilizing various visual and/or audio indicia.

Step 850 may, for example at sub-step 856, comprise receiving input information from a user regarding selection of at least one of the plurality of communication networks for performing a desired communication.

Step 850 may, for example at sub-step 858, comprise determining which of a plurality of communication pathways to utilize automatically without user interaction. Sub-step 858 may comprise automatically determining which of a plurality of communication pathways to utilize in any of a variety of manners, non-limiting examples of which were discussed previously.

For example and without limitation, sub-step 858 may comprise determining a recommended communication network or pathway based on determined communication pathway (or network) characteristics and utilizing such recommended communication network or pathway without interaction with the user. Also for example, sub-step 858 may comprise determining a set of potential communication pathways (or networks) to utilize and sequencing through the set of potential communication pathways (or networks) until a communication link is successfully established. Such a set of potential communication pathways may comprise characteristics of an ordered list of communication pathways or networks ordered by preference (e.g., ordered from most preferred to least preferred). Further for example, sub-step 858 may comprise determining a set of potential communication pathways (or networks) to utilize, concurrently attempting to establish communication links over the set of potential communication pathways (or networks), and determining to utilize the first successfully established communication link(s).

The exemplary method 800 may, at step 860 (e.g., after assisting the user in determining a communication pathway or network to utilize), comprise performing the desired communication over the determined communication pathway(s) or network(s). Step 860 may comprise performing such communication in any of a variety of manners, for example depending on the particular type of communication, particular communication pathways(s) or network(s) utilized, characteristics of other communicating devices, etc.

The exemplary method, at step 895, may comprise performing continued processing. Step 895, and any continued processing step herein, may comprise characteristics of performing any of a variety of continued processing activities. For example, step 895 may comprise further communicating with the user to additionally refine the communication pathway (or network) determination. Also for example, step 895 may comprise continuing to monitor characteristics associated with various communication pathways or networks and providing information to a user in particular circumstances (e.g., recommending a change to a different communication pathway or notifying the user of a potentially superior communication pathway to utilize).

The exemplary methods 700 and 800 illustrated in FIGS. 7-8 were presented to provide non-limiting exemplary illustrations of various functional aspects of the present invention. Accordingly, the scope of various aspects of the present invention should not be limited by characteristics of the exemplary methods 700 and 800.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of various aspects of the present invention.

In summary, various aspects of the present invention provide a system and method in a mobile communication device for providing assistance to a user in determining a communication pathway (or network). While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
   in a mobile communication device that supports a communication type over multiple networks:
   accessing availability information stored in a remote database for determining available networks among the multiple networks for performing the communication type;
   determining the available networks using the availability information;
   providing user assistance for determining a selected network among the available networks for the communication type; and
   performing the communication type using the selected network.

2. The method of claim 1, where providing user assistance comprises:
   determining a recommended network among the available networks based, at least in part, on user-defined criteria; and
   presenting an indication of the recommended network through a user interface.

3. The method of claim 1, where providing user assistance comprises:
   determining a recommended network among the available networks based, at least in part, on communication quality of the available networks; and
   presenting an indication of the recommended network through a user interface.

4. The method of claim 1, where providing user assistance comprises:
   determining a recommended network among the available networks based, at least in part, on monetary information associated with the available networks; and
   presenting an indication of the recommended network through a user interface.

5. The method of claim 1, where providing user assistance comprises:
   determining a recommended network among the available networks based, at least in part, on security level associated with the available networks; and
   presenting an indication of the recommended network through a user interface.

6. The method of claim 1, where providing user assistance comprises:
   presenting the available networks through a user interface; and
   presenting additional information associated with the available networks to the user, where the additional information comprises communication quality information, monetary information, data rate information, reliability information, or any combination thereof.

7. The method of claim 1, where providing user assistance comprises:
   presenting the available networks through a user interface; and
   receiving a user selection of the selected network.

8. A system comprising:
   a processor;
   a memory, comprising processor-executable instructions, that when executed by the processor, cause a mobile communication device that supports a communication type over multiple networks to:
   access availability information stored in a remote database for determining available networks among the multiple networks for performing the communication type;
   determine the available networks using the availability information;
   provide user assistance for determining a selected network among the available networks for the communication type; and
   perform the communication type using the selected network.

9. The system of claim 8, further comprising processor-executable instructions, that when executed by the processor, cause the mobile communication device to provide user assistance by:
   determining a recommended network among the available networks based, at least in part, on user-defined criteria; and
   presenting an indication of the recommended network through a user interface.

10. The system of claim 8, further comprising processor-executable instructions, that when executed by the processor, cause the mobile communication device to provide user assistance by determining a recommended network among the available networks based, at least in part, on communication quality of the available networks; and presenting an indication of the recommended network through a user interface.

11. The system of claim 8, further comprising processor-executable instructions, that when executed by the processor, cause the mobile communication device to provide user assistance by:

determining a recommended network among the available networks based, at least in part, on monetary information associated with the available networks; and presenting an indication of the recommended network through a user interface.

12. The system of claim 8, further comprising processor-executable instructions, that when executed by the processor, cause the mobile communication device to provide user assistance by:

determining a recommended network among the available networks based, at least in part, on security level associated with the available networks; and presenting an indication of the recommended network through a user interface.

13. The system of claim 8, further comprising processor-executable instructions, that when executed by the processor, cause the mobile communication device to provide user assistance by, at least in part:

presenting the available networks through a user interface; and presenting additional information associated with the available networks to the user, where the additional information comprises communication quality information, monetary information, data rate information, reliability information, or any combination thereof.

14. The system of claim 8, further comprising processor-executable instructions, that when executed by the processor, cause the mobile communication device to provide user assistance by, at least in part:

presenting the available networks through a user interface; and receiving a selection from the user of the selected network.

15. A device comprising:

a communication pathway selection module configured to determine, without user interaction, which of one of multiple networks to use for a communication type, by:

accessing availability information stored in a remote database for determining available networks among the multiple networks for performing the communication type;

creating an ordered list by preference of the available networks; and attempting, by order of preference, to establish a communication link with members of the ordered list until the communication link is successfully established with a particular network; and a communication interface module in communication with the communication pathway selection module, that performs the communication type using the particular network.

16. The device of claim 15, further comprising a user interface module, in communication with the communication pathway selection module, configured to present the particular network.

17. The device of claim 16, where the user interface module is further configured to presented additional information associated with the particular network to the user, where the additional information comprises communication quality information, monetary information, data rate information, reliability information, or any combination thereof.

18. The device of claim 15, where the multiple networks comprises a cellular telephone network, a Public Switched Telephone Network, the Internet, a Wide Area Network, a Local Area Network, a Personal Area Network, a Metropolitan Area Network, a terrestrial computer communication network, a satellite computer communication network, or any combination thereof.

19. The device of claim 15, where the communication type comprises voice communication, data file communication, multimedia communication, email communication, instant text message communication, web browsing communication, music streaming, video streaming, radio broadcasting, television broadcasting, Internet gaming communication, or any combination thereof.

20. The device of claim 15, where the communication pathway selection module is operable to attempt, by order of preference, to establish a communication link by:

sequentially attempting, by order of preference, to establish a communication link with members of the ordered list until the communication link is successfully established with a particular network.

* * * * *